United States Patent [19]
Johnson

[11] 3,868,454
[45] *Feb. 25, 1975

[54] PSORIASIS TREATMENT WITH MYCOPHENOLIC ACID DERIVATIVES

[75] Inventor: Irving S. Johnson, Indianapolis, Ind.

[73] Assignee: Eli Lilly and Company, Indianapolis, Ind.

[ * ] Notice: The portion of the term of this patent subsequent to July 18, 1989, has been disclaimed.

[22] Filed: Sept. 10, 1973

[21] Appl. No.: 396,027

Related U.S. Application Data

[63] Continuation-in-part of Ser. No. 280,626, Aug. 14, 1972, Pat. No. 3,777,020, which is a continuation-in-part of Ser. No. 191,824, Oct. 22, 1971, abandoned, which is a continuation-in-part of Ser. No. 93,432, Nov. 27, 1970, abandoned.

[52] U.S. Cl................. 424/248, 424/267, 424/274, 424/279
[51] Int. Cl........................................... A61k 27/00
[58] Field of Search ............ 424/248, 267, 274, 279

[56] References Cited
UNITED STATES PATENTS

| | | | |
|---|---|---|---|
| 3,705,894 | 12/1972 | Gerzon et al. | 424/279 |
| 3,705,946 | 12/1972 | Dyke et al. | 424/279 |
| 3,777,020 | 12/1973 | Johnson | 424/279 |

*Primary Examiner*—Jerome D. Goldberg
*Attorney, Agent, or Firm*—James L. Rowe; Everet F. Smith

[57] ABSTRACT

Psoriasis is treated orally and topically with derivatives of mycophenolic acid.

2 Claims, No Drawings

PSORIASIS TREATMENT WITH MYCOPHENOLIC ACID DERIVATIVES

CROSS-REFERENCE

This application is a continuation-in-part of my co-pending application, Ser. No. 280,626 filed Aug. 14, 1972, now U.S Pat. No. 3,777,020 issued Dec. 4, 1973, which was in turn a continuation in part of my then co-pending application Ser. No. 191,824, filed Oct. 22, 1971, now abandoned, which was in turn a continuation-in-part of my then co-pending application, Ser. No. 93,432, filed Nov. 27, 1970, now abandoned.

BACKGROUND OF THE INVENTION

Psoriasis is a common chronic skin disease whose cause is unknown. It is characterized by persistent patches of redness covered with scales. The disease is in part determined by a genetically dominant trait. While it is absent at birth, it can begin at any age from childhood to extreme old age. Psoriasis does not, however, appear to be a communicable disease and there are no known causative factors for it in the environment.

In the involved patches, the cells of the epidermis grow and multiply up to seven times faster than normal. The agents currently used for treatment of psoriasis include ultraviolet light, coal tar, ammoniated mercury, anthralin, and topical corticosteroids. Methotrexate has been used to treat psoriasis by systemic administration, but such treatment method is accompanied by all the side effects commonly encountered with its use for other conditions. Antimetabolite drugs such as aminopterin, thioguanine, and azaribine have also been used in treating this disease. Systemic corticosteroids or antimalarial drugs such as chloroquin may aggravate psoriasis by mechanisms that are not understood. A low relative humidity also aggravates the disease, probably by allowing desiccation of the skin and irritation.

It would, of course, be desirable to employ a topical treatment for psoriasis, but according to Comaish and Juhlin, *Arch. Dermatol.* 100, 99 (1969) methotrexate, a drug of choice in severe cases, was not successful in treating psoriasis by the topical route. In fact, of the anti-metabolite drugs, fluorouracil alone has been claimed to be effective in treating psoriasis by topical administration—see *Z. Haut-Geschlechtskrankh* 44, 361 (1969).

Mycophenolic acid is produced by various strains of fungi of the *Penicillium brevicompactum*, *Penicillium stoloniferum* and *Penicillium urticae* groups. The compound was the first biologically-active compound isolated from a mold. The initial isolation was carried out by Gosio in 1896 (Gosio, *Rivista d' Igiene e Sanita' pubblica*, Ann. 7, 825, 869, 961 [1896]). Structure work was effected largely through the efforts of Raistrick et al. from 1932 to 1935 (Raistrick et al., *Biochem. J.* 26, 1441 [1932]; *Biochem. J.* 27, 654 [1933]).

Mycophenolic acid is known to exhibit antifungal, antiviral and antibacterial activity. [See for example, *J. Gen. Virol.* 4, 629 (1969); *J. Antibiotics* 22, 297 (1969).]

Mycophenolic acid β-D-glucuronide is described by Ando et al. in *J. Antibiotics*, 23, 408 (1970) and its anti-tumor activity is set forth in that same article.

Other derivatives of mycophenolic acid including the 4-acylates and carbamates of mycophenolic acid and of the mycophenolic acid amide are disclosed in U.S. Pat. No. 3,705,894, in South African Pat. No. 68/4959 and in part in Jones and Mills, *J. Med. Chem.*, 14, 305 (1971). Other 4-carbamates are disclosed in West German Offenlegungsschirift 2237549 (July 31, 1972).

The use of mycophenolic acid in psoriasis is described in Belgian Pat. No. 775,785 issued May 27, 1972 based upon my U.S. patent applications Ser. No. 93,432 filed Nov. 27, 1970 and Ser. No. 191,824, filed Oct. 22, 1971.

SUMMARY OF THE INVENTION

This invention provides a method of treating psoriasis comprising administering to a human suffering from psoriasis an effective amount of a compound of the formula:

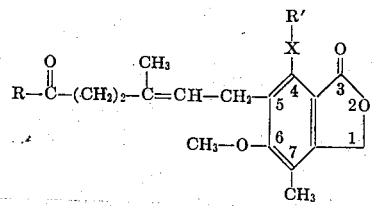

wherein R is M, O-($C_1$–$C_5$) alkyl, O-($C_3$–$C_5$) alkenyl or

wherein R' is H,

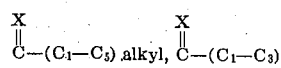

haloalkyl or

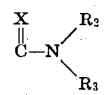

wherein $R^2$ is H or ($C_1$–$C_5$) alkyl, $R^3$ is H, ($C_1$–$C_5$) alkyl or ($C_3$–$C_8$) cycloalkyl, and $R^2$ and $R^3$ taken together are $(CH_2)_{4-5}$ or $(CH_2)_2$-O-$(CH_2)$ wherein X is S or O and M is OH, OK, ONa or $ONH_4$ with the provision that R' cannot be H if R is M.

In the above formula, when R and R' are both hydrogen, the compound is mycophonolic acid, named systematically as 6-[4-hydroxy-7-methyl-6-methoxy-3-oxo-5-phthalanyl]-4-methyl-4-hexenoic acid.

In the above formula, $R^2$ and $R^3$ when they are ($C_1$–$C_5$) alkyl can be methyl, ethyl, n-propyl, isopropyl, t-butyl, sec.-butyl, isobutyl, n-butyl, 1-pentyl, 2-pentyl, 3-pentyl, 3-methylbutyl, 3-methyl-2-butyl, t-amyl, neopentyl, etc. When $R^3$ is ($C_3$–$C_8$) cycloalkyl, it can be cyclobutyl, cyclopropyl, cyclopentyl, cyclohexyl, 3-methylcyclopentyl, 3-ethylcyclohexyl, cycloheptyl, 4-methylcycloheptyl, 2-methylcycloheptyl, cyclo-octyl, etc. When $R^2$ and $R^3$ are taken together to form a tetramethylene or a pentamethylene group, the resulting radical including the nitrogen to which it is attached will be a pyrolidine or piperidine radical. When $R^2$ and $R^3$ form an ethyleneoxyethylene radical, the resulting group when taken together with the nitrogen to which it is attached will be a morpholine. When R is O-(C₁–C₅) alkyl, the scope of the term "C₁–C₅ alkyl" is illustrated above with reference to the R² and R³ group. When R is O-(C₃–C₅) alkenyl, the (C₃–C₅) alkenyl groups are illustrated by the following radicals: 2-methyl-2-butenyl, 2-methyl-3-propenyl, allyl, methallyl, crotyl etc. Groups which illustrate R thus include the following: methoxy, ethoxy, isopropoxy, n-butoxy, n-amyloxy, 2-methyl-3-propenyloxy, amino, methylamino, dimethylamino, ethylamino, n-propylamino, di-n-propylamino, 2-pentylamino, di(n-butyl)amino, sec-butylamino and the like. Useful cyclo alkyl amine functions which can be part of a carbamoyl or thio carbamoyl group at 4 include cyclopropylamino, cyclobutylamino, cyclohexylamino, cyclooctylamino, methylcyclopentylamino etc.

Compounds illustrative of those represented by the above formula include the following:
Ethyl 6-(4-acetoxy-7-methyl-6-methoxy-3-oxo-5-phthalanyl)-4-methyl-4-hexenoate.
Crotyl 6-(4-thiolopropionyl-7-methyl-6-methoxy-3-oxo-5-phthalanyl)-4-methyl-4-hexenoate
Methallyl 6-(4-thiono-n-butyryloxy-7-methyl-6-methoxy-3-oxo-5-phthalanyl)-4-methyl-4-hexenoate.
Allyl 6-(4-dithiocaproyloxy-7-methyl-6-methoxy-3-oxo-5-phthalanyl)-4-methyl-4-hexenoate
N,N-dimethyl 6-(4-(N,N-dimethylthiocarbamoyloxy)-7-methyl-6-methoxy-3-oxo-5-phthalanyl)-4-methyl-4-hexenamide
6-(4-Thiocarbamoylthio-7-methyl-6-methoxy-3-oxo-5-phthalanyl)-4-methyl-4-hexenamide
Isopropyl 6-(4-piperidinocarbonyloxy-7-methyl-6-methoxy-3-oxo 5-phthalanyl)-4-methyl-4-hexenoate
n-Pentyl 6-(4-pyrrolidinothiocarbonyloxy-7-methyl-6-methoxy-3-oxo-5-phthalanyl)-4-methyl-4-hexenoate
6-(4-Morpholinothiocarbonylthio-7-methyl-6-methoxy-3-oxo-5-phthalanyl)-4-methyl-4-hexenoic acid
Sodium 6-[4-(N-cyclopropylcarbamoyloxy)-7-methyl-6-methoxy-3-oxo-5-phthalanyl]-4-methyl-4-hexenoate
Ammonium 6-[4-N-n-butyl-N-sec-butylcarbamoyloxy)-7-methyl-6-methoxy-3-oxo-5-phthalanyl]-4-methyl-4-hexenoate
N,N-tetramethylene 6-(4-thionoacetoxy-7-methyl-6-methoxy-3-oxo-5-phthalanyl)-4-methyl-4-hexenamide The preparation of compounds useful in the therapeutic process of this invention are disclosed in one or more of the following articles or patents;
J. Med. Chem., 14,305 (1971)
U.S. Pat. No. 3,705,894
South African Pat. No. 68/4959
W. German published specification (Offenlegungsschrift) 2,237,549 published 7-31-72 (Derwent No. 10882)

Derivatives of mycophenolic acid coming within the scope of the above formula can be administered to a human suffering from psoriasis either orally or topically. In the latter instance, an effective amount of the compound or a salt thereof for treating psoriasis is applied directly to the psoriatic lesion. For oral use, the mycophenolic acid derivative, or a salt thereof, is administered by that route in tablets or capsules or as a liquid solution or suspension. A preferred mode for oral administration is via gelatin capsules. A typical formulation in capsules is as follows: 9.4 kg. of 6-(4-n-butyloxy-7-methyl-6-methoxy-3-oxo-5-phthalanyl)-4-methyl-4-hexanoic acid prepared by one of the above procedure is thoroughly mixed with 4.7 kg. of starch and the mixture loaded into empty telescoping gelatin capsules. Each capsule contains the following ingredients:

499 mg. 6-(4-n-butyryloxy-7-methyl-6-methoxy-3-oxo-5-phthalanyl)-4-methyl-4-hexanoic acid
200 mg. starch For topical use, the mycophenolic acid derivative or a salt thereof is formulated as an ointment or in a solution.

A typical ointment useful in applying a compound of the above formula to a psoriatic lesion contains the following ingredients per gram of ointment:

| | |
|---|---|
| Ethyl 6-(4-acetoxy-7-methyl-6-methoxy-3-oxo-5-phthalanyl)-4-methyl-4-hexenoate | 50 mg. |
| Polyethylene glycol 300 (N.F.) | 600 mg. |
| Polyethylene glycol 4000 (U.S.P.) | 350 mg. |

A typical solution contains the following ingredients per gram of solution:

| | |
|---|---|
| methyl 6-(4-hydroxy-7-methyl-6-methoxy-3-oxo-5-phthalanyl)-4-methyl-4-hexenoate | 50 mg. |
| Polyethylene glycol 300 (N.F.). | 950 mg. |

In any of the above formulations, other mycophenolic acid derivatives prepared by the methods described above can be substituted for those actually specified.

In carrying out one aspect of my novel treatment method, a mycophenolic acid derivative or a salt thereof according to the above structure formulated as an ointment or solution as indicated above, is applied to a psoriatic lesion at a rate varying from 3 mcg per square cm of skin surface per day up to 300 mch per square cm of skin surface per day until the psoriatic process is checked. The ointment or solution can be applied daily for 14 days using a continuous occlusive dressing. The concentration of mycophenolic acid derivatives or of a salt thereof in the ointment or solution can vary from 0.05 percent to 5 percent; with these concentrations a dose of 0.01 ml per square cm of skin surface readily supplies the amount of mycophenolic acid derivatives specified above. The daily topical dose for a 70 kgm person should not exceed about 1.5 g. of the active agent.

However, if oral administration is desirable, a daily dosage of from 1 to 10 gm. in divided dosages 3 or 4 times per day of a mycophenolic acid derivative or of a salt thereof can be employed, using any of the commonly accepted oral dosage forms.

I claim:
1. A method of treating psoriasis comprising the administration to a human suffering from psoriasis either orally or topically of an effective amount for treating psoriasis of a compound of the formula

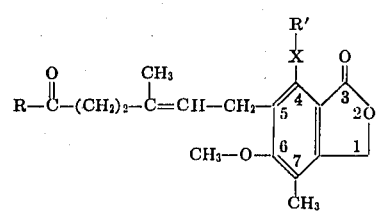

wherein R is M, O-(C$_1$-C$_5$) alkyl, O-(C$_3$-C$_5$) alkenyl or

wherein R' is H,

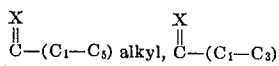

haloalkyl or

wherein R$^2$ is H or (C$_1$-C$_5$) alkyl, R$^3$ is H, (C$_1$-C$_5$) alkyl or (C$_3$-C$_8$) cycloalkyl, and R$^2$ and R$^3$ taken together are (CH$_2$)$_{4-5}$ or (CH$_2$)$_2$-O-(CH$_2$)$_2$ wherein X is S or O and M is OH, OK, ONa or ONH$_4$ with the provision that R' cannot be H if R is M.

2. A method according to claim 1 wherein from 1 to 10 gm. per day in divided doses of a compound of the formula

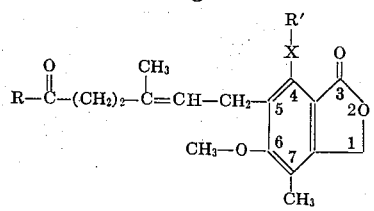

wherein R is M, O-(C$_1$-C$_5$) alkyl, O-(C$_3$-C$_5$) alkenyl or

wherein R' is H,

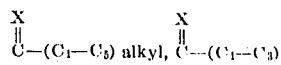

haloalkyl or

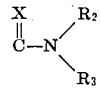

wherein R$^2$ is H or (C$_1$-C$_5$) alkyl, R$^3$ is H, (C$_1$-C$_5$) alkyl or (C$_3$-C$_8$) cycloalkyl, and R$^2$ and R$^3$ taken together are (CH$_2$)$_{4-5}$ or (CH$_2$)$_2$-O-(CH$_2$)$_2$ wherein X is S or O and M is OH, OK, ONa or ONH$_4$ with the provision that R' cannot be H if R is M.

* * * * *